(12) United States Patent
Hagihara et al.

(10) Patent No.: US 6,383,980 B1
(45) Date of Patent: May 7, 2002

(54) PHOTOCATALYTIC TITANIUM DIOXIDE POWDER, PROCESS FOR PRODUCING SAME, AND APPLICATIONS THEREOF

(75) Inventors: Hiroyuki Hagihara, Tokyo; Katsura Ito, Shiojiri, both of (JP)

(73) Assignee: Showa Denko Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/657,936

(22) Filed: Sep. 8, 2000

Related U.S. Application Data
(60) Provisional application No. 60/156,955, filed on Sep. 30, 1999.

(30) Foreign Application Priority Data
Sep. 8, 1999 (JP) ............................................. 11-254335

(51) Int. Cl.[7] ........................... B01J 23/02; B01J 31/00; B01J 21/08; B32B 15/02
(52) U.S. Cl. ...................... 502/340; 502/159; 502/242; 502/250; 502/252; 502/350; 502/341; 502/342; 502/343; 502/527.13; 502/328; 502/329; 502/330; 502/331; 502/527.12; 428/403; 428/405; 428/328; 106/287.13; 106/287.16
(58) Field of Search .................................. 502/159, 242, 502/250, 252, 340–343, 350, 328–331, 527.12, 527.13; 428/403, 405, 328; 106/287.13, 287.16; 522/28, 29, 66; 523/125, 126

(56) References Cited
U.S. PATENT DOCUMENTS

| | | | | |
|---|---|---|---|---|
| 5,981,425 A | * | 11/1999 | Taoda et al. ................ | 502/208 |
| 6,090,736 A | * | 7/2000 | Taoda et al. ................... | 502/5 |
| 6,165,256 A | * | 12/2000 | Hayakawa et al. ........... | 106/13 |
| 6,180,548 B1 | * | 1/2001 | Taoda et al. ................ | 501/137 |
| 6,187,438 B1 | * | 2/2001 | Chopin et al. .............. | 428/403 |
| 6,191,062 B1 | * | 2/2001 | Hayakawa et al. .... | 502/527.12 |
| 6,268,050 B1 | * | 7/2001 | Watanabe et al. ......... | 428/312.8 |
| 6,291,067 B1 | * | 9/2001 | Taoda et al. ................ | 428/375 |

* cited by examiner

*Primary Examiner*—Mark L. Bell
*Assistant Examiner*—Patricia L. Hailey
(74) *Attorney, Agent, or Firm*—Sughrue Mion, PLLC

(57) ABSTRACT

A photocatalytic titanium dioxide powder comprised of finely divided titanium dioxide particles each having supported on the surface thereof a first supported layer of a calcium compound and further having on the surface of the first supported layer-formed particles a porous second supported layer of a photocatalytically inactive and substantially water-insoluble substance. The photocatalytic titanium dioxide powder is produced by allowing a calcium compound to be supported on the surface of finely divided titanium dioxide particles to form the first supported layer; and then, allowing a precursor material capable of forming the photocatalytically inactive and substantially water-insoluble substance to be supported on the surface of the first supported layer-formed particles, followed by converting the precursor a material to said water-insoluble substance to thereby form the porous second supported layer. A composition comprising a polymer and the photocatalytic titanium dioxide powder is used as a shaping material or a coating material for the fabrication of a shaped article or structure for environmental purification.

20 Claims, No Drawings

PHOTOCATALYTIC TITANIUM DIOXIDE POWDER, PROCESS FOR PRODUCING SAME, AND APPLICATIONS THEREOF

CROSS-REFERENCE TO RELATED APPLICATION

This application is an application filed under 35 U.S.C. §111(a) claiming benefit pursuant to 35 U.S.C. §119(e)(1) of the filing date of Provisional Application 60/156,955 filed Sep. 30, 1999, pursuant to U.S.C. §111(b).

BACKGROUND OF THE INVENTION (1) Field of the Invention

This invention relates to a photocatalytic titanium dioxide powder, process for producing the same and applications thereof. More particularly, it relates to a photocatalytic powder comprising finely divided titanium dioxide particles having a first calcium oxide layer and a second substantially water-insoluble substance layer; a process for producing the photocatalytic titanium dioxide powder; a polymer composition comprising the photocatalytic titanium dioxide powder; a shaped article made of the polymer composition; and a structure having a coating of the polymer composition.

The photocatalytic titanium dioxide powder of the present invention is used as an environmental clarification material for removing malodor, decomposition-removing harmful substances or pollutants in air, treating drainage, purifying waste water, or performing sterilization or algicidal treatment of water. In particular, the photocatalytic titanium dioxide powder of the present invention is suitably used as an environmental clarification material by coating it on the surface of textile fiber, paper or plastic article, or incorporating it into textile fiber or plastic article, or used in the form of a coating material.

(2) Description of the Related Art

In recent years, photocatalysts using finely divided titanium dioxide particles are attracting attention as an environmental clarification material used for the purpose of antibacterial effect, deodorization, anti-staining or air or water clarification. The photocatalytic mechanism of the titanium dioxide is considered as follows. An electron and a hole generated inside the finely divided titanium dioxide particles convert water and oxygen present in the vicinity of the surface of the titanium dioxide particles into hydroxyl radical or hydrogen peroxide, and by virtue of the strong oxidation-reduction function of hydroxyl radical or hydrogen peroxide, harmful substances are converted into a harmless substance such as carbon dioxide gas, thereby attaining clarification. This photocatalytic action of finely divided titanium dioxide particles is said to permanently lasts as long as finely divided titanium dioxide particles, light, water and oxygen are present.

As applications of the titanium dioxide photocatalyst attempts are being made wherein the photocatalyst is incorporated in a medium having a shape suitable for handling such as fiber and plastic molded article, or a the surface of a substrate such as cloth and paper is coated with the photocatalyst. However, the strong photocatalytic action of titanium dioxide causes decomposition or degradation not only of harmful organic materials or environmental pollutants but also of the medium itself such as textile fiber, plastic and paper. This stands as an obstacle to the practical use of titanium dioxide photocatalyst. A coating material obtained by mixing finely divided titanium dioxide particles and a binder is drawing attention because of its good handling properties. However, an inexpensive binder exhibiting no adverse effect on the above-described medium has not yet been found out.

A process of allowing a photocatalytically inactive compound to be supported in the form of islands on the surface of titanium dioxide particles thereby suppressing the photocatalytic activity thereof so as to prevent or minimizing degradation of a plastic medium or a binder attributable to the activity of titanium dioxide particles is proposed in Japanese Unexamined Patent Application No. H9-225319 and H9-239277 (the term "Japanese unexamined patent publication" is hereinafter abbreviated to "JP-A"). According to this process, the degradation of a plastic medium or a binder is reduced, but, the photocatalytically inactive compound directly adheres to the active site on the surface of titanium dioxide particles, therefore, it reduces the activity of the titanium dioxide particles as a photocatalyst, namely, it counteracts the photocatalytic activity thereof.

A photocatalyst comprising titanium dioxide particle, the surface of which is coated with porous calcium phosphate is proposed in JP-A H10-244166. This coated titanium dioxide particle has durability which is still poor under irradiation of a strong ultraviolet ray such as sunlight.

SUMMARY OF THE INVENTION

In view of the foregoing problems of the heretofore proposed techniques, an object of the present invention is to provide a photocatalytic titanium dioxide powder which can effectively and advantageously perform the environmental clarification, for example, which can remove malodor, decomposition-remove harmful substances or pollutants in air, treat drainage, purify waste water and impart bactericidal or antifungal properties, in particular, which deteriorates mediums such as textile fiber, paper or plastic shaped article only to a negligible extent and exhibits excellent durability for a long period of time when it is coated on textile fiber, paper of plastic shaped article, incorporated into fiber or plastic shaped article, or used in the form of a coating material.

Other objects of the present invention are to provide a process for producing the above-mentioned photocatalytic titanium dioxide powder, a polymer composition comprising an organic polymer and the photocatalytic titanium dioxide powder, a shaped article made of the polymer composition, and a structure having a coating formed from the polymer composition.

To sum up, the objects of the present invention are to provide a photocatalytic titanium dioxide powder capable of exhibiting durable photocatalytic activity in the environment irradiated with strong light such as sunlight, a polymer composition comprising the photocatalytic powder, a shaped article made of the polymer composition, and a structure having a coating of the polymer composition.

As a result of extensive researches to attain the above-described objects, the present inventors have found that when a first supported layer composed of a calcium compound is formed on the surface of finely divided titanium dioxide particle, and further, a porous second supported layer composed of a photocatalytically inactive and substantially water-insoluble substance is formed on the surface of the first supported layer-formed titanium dioxide particle, the photocatalytic activity of finely divided titanium dioxide particle can be maintained for a long time without substantial deterioration of mediums such as textile fiber, paper and plastic material, i.e., the two supported layer-formed titanium dioxide particle exhibits durable photocatalytic activity.

In one aspect of the present invention, there is provided a photocatalytic titanium dioxide powder comprising finely divided titanium dioxide particles each having supported on the surface thereof a first supported layer comprising a calcium compound, and further having supported on the surface of said first supported layer-formed titanium dioxide particle a porous second supported layer comprising a photocatalytically inactive and substantially water-insoluble substance. The substantially water-insoluble substance preferably has a solubility product in water as measured at 25° C. of not larger than about $10^{-25}$.

In other aspects of the present invention, there are provided processes for producing the above-mentioned titanium dioxide powder, which include:

(1) a process for producing a photocatalytic titanium dioxide powder, comprising the steps of:

allowing a calcium compound to be supported on the surface of finely divided titanium dioxide particles to form a first supported layer; and then, allowing a material capable of forming a photocatalytically inactive and substantially water-insoluble substance to be supported on the surface of said first supported layer-formed titanium dioxide particles, followed by drying or burning said material-supported titanium dioxide particles to form a porous second supported layer comprising the photocatalytically inactive and substantially water-insoluble substance;

(2) a process for producing a photocatalytic titanium dioxide powder, comprising the steps of:

allowing a calcium compound to be supported on the surface of finely divided titanium dioxide particles to form a first supported layer; and then, contacting the surface of said first supported layer-formed titanium dioxide particles with an aqueous alkali solution containing a metal ion, followed by neutralizing the metal ion-containing alkali solution to form a porous second supported layer comprising a photocatalytically inactive and substantially water-insoluble substance on the surface of said first supported layer-formed titanium dioxide particles; and (3) a process for producing a photocatalytic titanium dioxide powder, comprising the steps of:

allowing a calcium compound to be supported on the surface of finely divided titanium dioxide particles to form a first supported layer, and then hydrolyzing a metal alkoxide on the surface of said first supported layer-formed titanium dioxide particles to form a porous second supported layer comprising a photocatalytically inactive and substantially water-insoluble substance on the surface of said first supported layer-formed titanium dioxide particles.

In further aspects of the present invention, there are provided a polymer composition comprising an organic polymer as a medium, and a photocatalytic titanium dioxide powder; said titanium dioxide powder comprising the above-mentioned first supported layer- and second supported layer-formed finely divided titanium dioxide particles; a shaped article made of the polymer composition; and a structure having a coating comprising the polymer composition.

DETAILED DESCRIPTION OF PREFERRED EMBODIMENTS

The finely divided titanium dioxide particles used in the present invention are not particularly limited provided that they have photocatalytic activity. However, those having a crystal form mainly comprising anatase or brookite are preferred because of their high photocatalytic activity. The finely divided titanium dioxide particles used in the present invention preferably have an average primary particle diameter in the range of from about 0.001 μm to about 0.2 μm, and more preferably from about 0.01 μm to about 0.1 μm. If the average primary particle diameter is smaller than about 0.001 μm, efficient production is difficult to attain and this is not practical. In contrast, if it exceeds about 0.2 μm, the photocatalytic activity greatly decreases.

The process for producing the finely divided titanium dioxide particles used in the present invention is not particularly limited provided that particles having fundamentally photocatalytic activity are produced. For example, there can be mentioned a process comprising treating titanium halide as starting material by a vapor phase reaction, a process for hydrolyzing titanium halide or titanyl sulfate in a wet phase, and a process for burning products produced by these processes.

The calcium compound supported on the surface of finely divided titanium dioxide particle is selected from those which are substantially water-insoluble so that the calcium compound is not readily dissolved out from the titanium dioxide particle. The calcium compound is not particularly limited as long as it is substantially insoluble in water. As examples of the calcium compound, there can be mentioned, calcium oxide, calcium phosphate, calcium sulfate, calcium nitrate, calcium carbonate and calcium salts of an organic acid. Of these, calcium phosphate, a calcium organic carboxylate and calcium oxide are preferred.

As a process for allowing a calcium compound to be supported on the surface of finely divided titanium dioxide particle, there can be mentioned, for example, a process of dispersing finely divided titanium dioxide particles in a solution of a soluble calcium salt, e.g., an aqueous calcium chloride solution, and adding a precipitant to the solution to deposit the calcium compound on the surface of the titanium dioxide particles (for example, adding $Na_2HPO_4$ to deposit calcium phosphate). If desired, this operation of depositing calcium compound can be repeated to form two or more coating layers of calcium compound.

The configuration and form of the first supported layer comprising a calcium compound is not particularly limited as long as the photocatalytic function of finely divided titanium dioxide particle is maintained. The first supported layer may have, for example, a configuration such that the calcium compound is dispersed and supported in the form of islands on the surface of titanium dioxide particle, or a configuration such that calcium compound is supported on the entire surface of each titanium dioxide particle to form a porous covering layer on the surface thereof.

The weight of the first supported layer comprising a calcium compound is preferably in the range of from about 0.01% to about 10 by weight, more preferably from about 0.1% to about 5% by weight based on the weight of titanium dioxide. If the weight of the first supported layer is smaller than about 0.01% by weight, the durability as a photocatalyst deteriorates when the photocatalytic powder is added to plastic or other mediums. In contrast, if it exceeds about 10% by weight, the photocatalytic function decreases.

The photocatalytic titanium dioxide powder of the present invention is characterized as having a porous second supported layer comprising a photocatalytically inactive and substantially water-insoluble substance, which is further supported on the surface of the first supported layer-formed titanium dioxide particle. By forming the second supported layer, the high catalytic activity of finely divided titanium dioxide particles can be almost completely maintained, the deterioration of a polymer medium can be prevented or minimized, and the photocatalyst can have much enhanced durability. The substance forming the second supported layer is a photocatalytically inactive and water-insoluble substance. This substance must be capable of forming a porous second supported layer. The solubility in water of this substance is preferably such that the solubility product (which is also called as solubility constant) in water as measured at a temperature of 25° C. is not larger than about $10^{-25}$. The term "porous second supported layer" as used herein means that the second supported layer comprises a solid substance having a multiplicity of micropores such that the micropore size and the layer thickness are on the level of not inhibiting transfer of a gas such as $NO_x$ or organic low molecular substances, and also allowing the transmission of light through the layer.

The second supported layer is not limited to be present only on the outer surface of first supported layer, but may have parts formed on the surface area where the first supported layer is not present, namely, formed on the exposed surface of titanium dioxide particle.

The substantially water-insoluble substance for forming the second supported layer includes, for example, substantially water-soluble substances containing at least one element selected from Be, B, Mg, Al, Si, V, Cr, Mn, Fe, Co, Cu, Zn, Ge, Zr, Ag, In, Sn, Pb, Sb, Ba, Ta and Ce. As specific examples thereof, there can be mentioned metal oxides such as $BeO$, $B_2O_3$, $MgO$, $Al_2O_3$, $SiO_2$, $SiO$, $V_2O_5$, $CrO$, $Cr_2O_3$, $MnO$, $Mn_2O_3$, $MnO_2$, $Mn_3O_4$, $Fe_2O_3$, $Fe_3O_4$, $CoO$, $Co_3O_4$, $Cu_2O$, $CuO$, $ZnO$, $GeO_2$, $ZrO_2$, $Ag_2O$, $InO$, $In_2O_3$, $SnO$, $SnO_2$, $Pb_3O_4$, $PbO2$, $PbO$, $SbO_2$, $Sb_2O_3$, $Sb_2O_5$, $BaTiO_3$, $TaO_2$, $Ta_2O_5$, $CeO_2$, $CaTiO_3$ and $FeTiO_3$; and non-metal oxides such as $CuS$, $Cu(OH)_2$, $AgCl$, $AgBr$, $AgI$, $AgS$, $Mg(OH)_2$, $MgCO_3$, $CaCO_3$, $BaCO_3$, $Zn(OH)_2$, $ZnS$, $ZnCO_3$, $CdS$, $Al(OH)_3$, $Sn(OH)_2$, $SnS$, $SnS_2$, $PbS$, $PbCl_2$, $PbSO_{31}$, $PbCO_3$, $Sb_2S_3$ and $FeS$. Among these substantially water-insoluble substances, silica, alumina, zirconia, aluminum hydroxide, titanium hydroxide and aluminum phosphate are preferable. Silica, alumina and zirconia are especially preferable.

For forming the porous second supported layer, either a process of allowing a photocatalytically inactive and substantially water-insoluble substance to be supported directly on the surface of the first supported layer-formed titanium dioxide particle, or a process of allowing a precursor of a photocatalytically inactive and substantially water-insoluble substance to be supported and converted into the substantially insoluble substance on the surface of the first supported layer-formed titanium dioxide particle may be used. As examples of the latter process using a precursor of a photocatalytically inactive and substantially water-insoluble substance, there can be mentioned the following three processes.

(1) A process wherein a precursor material capable of forming a photocatalytically inactive and substantially water-insoluble substance preferably having a solubility product in water of not more than about $10^{-25}$ is supported on the surface of the first supported layer-formed titanium dioxide particles, and then, said precursor material-supported titanium dioxide particles are dried and/or burnt to form a porous second supported layer comprising the photocatalytically inactive and substantially water-insoluble substance. As specific examples of the precursor material, there can be mentioned a silicone oligomer and a silane coupling material.

(2) A process wherein the surface of the first supported layer-formed titanium dioxide particle is contacted with an aqueous alkali solution containing a metal ion, followed by neutralizing the metal ion-containing alkali solution to form a porous second supported layer comprising a photocatalytically inactive and substantially water-insoluble substance preferably having a solubility product in water of not more than about $10^{-25}$ on the surface of said first supported layer-formed titanium dioxide particles. For example, the surface of the first supported layer-formed titanium dioxide particle is contacted with an aqueous solution of an alkali (e.g., sodium) aluminate, alkali silicate or alkali zirconate, and then an inorganic acid is added to neutralize the aqueous alkali-containing solution whereby porous alumina is deposited to form the porous second supported layer.

(3) A process where a metal alkoxide is hydrolyzed on the surface of said first supported layer-formed titanium dioxide particles to form a porous second supported layer comprising the photocatalytically inactive and substantially water-insoluble substance on the surface of the first supported layer-formed titanium dioxide particles. As examples of the metal alkoxide, there can be mentioned an alkoxide of aluminum, silicon or zirconium. For example, an alcoholic slurry containing zirconium n-butoxide is hydrolyzed by adding thereto ethylene glycol and water to thereby deposit zirconia to form a porous second supported layer.

As specific examples of the metal alkoxide, there can be mentioned zirconium n-butoxide, aluminum triethoxide, aluminum triisopropoxide, methyl silicate, ethyl silicate, silicon ethoxide and zirconium isopropoxide.

If desired, the operation of forming the second supported layer may be repeated to form two or more porous second supporting layers.

The weight of the porous second supported layer is preferably in the range of from about 0.01% to about 50% by weight, more preferably from about 0.1% to 20% by weight, based on the weight of titanium dioxide. If the weight of the porous second supported layer is smaller than about 0.01% by weight, when the photocatalytic powder is added to a plastic medium or other mediums, the durability as a photocatalyst deteriorates. In contrast, if it exceeds 50% by weight, the photocatalytic function decreases and the cost of the photocatalytic powder increases.

The photocatalytic titanium dioxide powder having an environmental clarification function of the present invention may support thereon at least one metal selected from the group consisting of platinum, rhodium, ruthenium, palladium, silver, copper and zinc. When such a metal is supported, the oxidative decomposition of chemical substances induced by the photocatalytic action through titanium dioxide proceeds at a higher rate and the sterilizing or algicidal activity is intensified.

The metal may be supported by depositing the metal at any stage or stages in the course of preparing the photocatalytic titanium dioxide powder. Thus, the metal may be supported on the surface of starting finely divided titanium dioxide particle; on the surface of the first supported layer or in the first supported layer of the first supported layer-formed finely divided titanium dioxide particle; or on the surface of the porous second supported layer or in the porous second supported layer of the second supported layer-formed finely divided titanium dioxide particle. The metal may be supported by an ordinary process, and the amount of metal supported is usually in the range of from about 0.001% to 10% by weight, based on the weight of the photocatalytic titanium dioxide powder.

The photocatalytic titanium dioxide powder of the present invention can be used in the form of an organic polymer composition by incorporating the photocatalytic powder into an organic polymer. The organic polymer is not particularly limited and may be selected from the polymers over a wide range including thermoplastic synthetic polymers, thermosetting synthetic polymers and natural polymers, The photocatalytic titanium dioxide powder of the present invention has on the surface thereof the above-described first supported layer and second supported layer, therefore, when it is incorporated in an organic polymer, the organic polymer is not brought into direct contact with the surface of titanium dioxide particle and the decomposition or degradation of organic polymer is prevented or minimized.

Specific examples of the organic polymer used as a medium include polyethylene, polyamide, poly(vinyl chloride), poly(vinylidene chloride), polyesters such as poly(ethylene terephthalate), aramid and thermosetting unsaturated polyesters, polypropylene, poly(ethylene oxide), poly(ethylene glycol), silicon resin, poly(vinyl alcohol), vinyl acetal resin, ABS resin, epoxy resin, vinyl acetate resin, cellulose, cellulose derivatives, regenerated celluloses, e.g., rayon, polyurethane, polycarbonate, polystyrene, urea resin, fluororesins such as poly(vinylidene fluoride) and polytetrafluoroethylene, phenol resin, celluloid, chitin, starch, acrylic resin, melamine resin and alkyd resin.

The polymer composition comprising the above-described organic polymer and the photocatalytic titanium dioxide powder of the present invention may be used as an environmental clarification material in the form of a coating material, a coating composition, a compound or a masterbatch. The concentration of photocatalytic titanium dioxide powder in the polymer composition is usually in the a range of from about 0.01% to about 80% by weight, preferably from about 1% to about 50% by weight, based on the total weight of the polymer composition.

The polymer composition may have incorporated therein an absorbent capable of absorbing malodorous or harmful substances, such as activated carbon and zeolite.

By shaping the polymer composition into shaped articles including a molded article, a polymer shaped article having an environmental clarification function can be obtained. Examples of the polymer shaped article include extrusion molded articles such as fiber, film and sheet, and injection molded articles, and compression molded articles.

Because of excellent durability, the polymer composition of the present invention can also be applied as a coating composition for structures such as glass, signboard, concrete and walls. Furthermore, the polymer composition of the present invention can be coated on organic structures such as paper, plastic molded articles, textile fabrics and wooden articles, or structures having a coating, such as vehicles, and also in this case, the photocatalytic function can be fully brought out without great influence on the structure or coating.

The present invention will now be specifically described by referring to the following working examples, but the present invention should not be construed as being limited to the examples. Unless otherwise specified, "%" in the following Examples and Comparative Examples is based on the weight.

EXAMPLE 1

Into 2.8 liters of pure water, 120 g of ultrafine titanium dioxide powder ("F-4" tradename, supplied by Showa Titanium K.K., average primary particle diameter: 0.03 μm) was incorporated and dispersed to obtain a titanium dioxide slurry. Separately, NaCl, $Na_2HPO_4$, $KH_2PO_4$, KCl, $MgCl_2.6H_2O$ and $CaCl_2$ were added to pure water to prepare 3.5 liters of a salt solution adjusted to have a concentration, after the salt solution was mixed with the titanium dioxide slurry prepared above, such that $Na^+$ was 139 mM, $K^+$ was 2.8 mM, $Ca^{2+}$ was 1.8 mM, $Mg^{2+}$ was 0.5 mM, $Cl^-$ was 144 mM, and the sum of $HPO_4^{2-}$ and $H_2PO_4^-$ was 1.1 mM. 2.8 liters of the titanium dioxide slurry prepared above and 3.5 liters of this salt solution were mixed together and kept at a temperature of 40° C. for 24 hours. Thereafter, the slurry was filtered, washed (using ADVANTECK MEMBRANE FILTER having a pore size of 0.2 μm) and dried at 120° C. for 4 hours to obtain 100 g of titanium dioxide fine powder having supported on the surface thereof calcium phosphate.

The thus-obtained titanium dioxide fine powder having on the surface thereof a calcium phosphate-supported layer was mixed in a blender (WORLING) and thereon 20% of silicone oligomer ("AFP-1" tradename, supplied by Shin-Etsu Chemical Co., Ltd.) was sprayed. The resulting mixed powder was dried in air at 120° C. for 2 hours and then burnt at 500° C. for 10 hours. Chemical analysis of the powder revealed that it supported 1% of calcium phosphate and 10% of porous silica.

Then, 3.5 g of this titanium dioxide fine powder having a porous silica-supported layer was placed in 90 mmφ Petri dish, then the Petri dish was placed in a 5 liter-volume TEDLER bag filled with acetaldehyde at an initial concentration of 40 ppm, and the titanium dioxide powder was irradiated with an ultraviolet ray of 365 nm using a black light at an intensity of 0.23 mW/cm². After one hour from the initiation of ultraviolet ray irradiation, the acetaldehyde concentration was measured by a detector tube, as a result, the residual percentage of acetaldehyde was proved to be 5%.

Then, 20% of the above-mentioned titanium dioxide fine powder having a porous silica-supported layer was mixed with urethane resin ("RUBIPEARL" tradename, supplied by Toyo Polymer K.K.) for the fiber coating to manufacture a coating agent containing a photocatalyst. A sheet glass was coated with the coating agent at a thickness of 50 μm and the coating formed was irradiated with an ultraviolet ray of 50 mW/cm². After 100 hours, the residual percentage of coating was measured, as a result, the residual percentage was 93%.

EXAMPLE 2

Into 2.8 liters of pure water, 0.6 9 of a commercially available polycarboxylic acid-type polymeric surfactant ("POISE 530" trade name, supplied by Kao Corporation) was added, and further thereto 120 g of ultrafine titanium dioxide powder ("F-4" tradename, supplied by Showa Titanium K.K., average primary particle diameter: 0.03 μm) was charged and dispersed to obtain a titanium dioxide slurry.

Separately, $CaCl_2$ was added to pure water to prepare 3.5 liters of a salt solution adjusted to have a $Ca^{2+}$ concentration of 1.8 mM after the salt solution was mixed with the titanium dioxide slurry prepared above. Subsequently, 2.5 liters of the titanium dioxide slurry prepared above and 3.5 liters of this salt solution were mixed together and kept at a temperature of 40° C. for 24 hours. Thereafter, the slurry was filtered, washed and dried in the same manner as in Example 1 to obtain titanium dioxide fine powder having supported thereon calcium salt of a polymer surfactant.

By treating the thus-obtained titanium dioxide fine powder having supported thereon calcium salt in the same manner as in Example 19 titanium dioxide fine powder having on the surface thereof a porous silica-supported layer was prepared, and further a coating was made. The coating was evaluated and the results obtained are shown in Table 1, The coating was burnt, and analyzed by the infrared-absorption spectrum process (FT-IR method), as a result, the surfactant calcium salt was proved to be absent. From this, the calcium ion is considered to have been converted into calcium oxide at the step of burning.

EXAMPLE 3

A titanium dioxide fine powder having a calcium phosphate-supported layer was obtained in the same manner as in Example 1. 50 g of the titanium oxide powder and 0.02 mol of sodium aluminate were added to 70 ml of pure water to obtain a titanium dioxide slurry. To the slurry obtained, 0.06 mol/liter of dilute sulfuric acid was added dropwise to adjust the pH to 7.2. Thereafter, the slurry was filtered, washed and dried at 120° C. for 4 hours to obtain a titanium dioxide fine powder having on the surface thereof a porous alumina-supported layer. A coating was made and evaluated in the same manner as in Example 1. The results obtained are shown in Table 1.

EXAMPLE 4

A titanium dioxide fine powder having a calcium phosphate-supported layer was prepared in the same manner as in Example 1. 50 g of the titanium dioxide fine powder, 1 mol of zirconium n-butoxide and 2.5 liters of ethanol were mixed together to prepare a slurry. To the slurry, 2 mol of ethylene glycol and 72 ml of water were added to carry out hydrolysis. The slurry obtained was filtered, washed and dried at 120° C. for 4 hours to obtain titanium dioxide fine powder having on the surface thereof a porous zirconia-supported layer. A coating was made and evaluated in the same manner as in Example 1. The results obtained are shown in Table 1.

EXAMPLE 5

Titanium dioxide fine powder having supported thereon porous zirconia was prepared in the same manner as in Example 4 except that the titanium dioxide fine powder having a calcium phosphate-supported layer used in Example 4 was changed to titanium dioxide fine powder having supported thereon calcium salt of a polymer surfactant obtained in the same manner as in Example 2. A coating was made and evaluated. The results obtained are shown in Table 1. In Table 1, the polymeric surfactant calcium salt is referred to as calcium polycarboxylate.

Comparative Example 1

A coating was made and evaluated in the same manner as in Example 1 except that the calcium phosphate-supported layer and the porous silica-supported layer were not formed on the ultrafine titanium dioxide powder ("F-4" tradename, supplied by Showa Titanium K.K., average primary particle diameter: 0.03 $\mu$m). The results obtained are shown in Table 1.

Comparative Example 2

A coating was made and evaluated in the same manner as in Example 1 except that the porous silica-supported layer was not formed on the titanium dioxide fine powder having a calcium phosphate-supported layer (i.e., a powder before the treatment with silicone oligomer) obtained in the same manner as in Example 1. The results obtained are shown in Table 1.

Comparative Example 3

A coating was made and evaluated in the same manner as in Example 1 except that the porous silica-supported layer was not formed on the titanium dioxide fine powder having supported thereon calcium salt of a polymeric surfactant (i.e., a powder before the treatment with a silicone oligomer) obtained in the same manner as in Example 2. The results obtained are shown in Table 1.

Comparative Example 4

A titanium dioxide fine powder having supported thereon calcium salt of a polymeric surfactant (ie., a powder before the treatment with silicone oligomer) was prepared in the same manner as in Example 2. The titanium oxide fine powder was burnt at 500° C. for 10 hours to obtain a titanium dioxide fine powder having a calcium oxide-supported layer. Using this titanium dioxide fine powder, a coating was made and evaluated in the same manner as in Example 1 except that the porous silica-supported layer was not formed. The results obtained are shown in Table 1.

Comparative Example 5

Using ultrafine titanium dioxide powder ("F-4" tradename, supplied by Showa Titanium K.K., average primary particle diameter: 0.03 $\mu$m), titanium dioxide fine powder having a porous alumina-supported layer was prepared in the same manner as in Example 3 except that the calcium phosphate-supported layer was not formed. A coating was made and evaluated. The results obtained are shown in Table 1.

Comparative Example 6

Using ultrafine titanium dioxide powder ("F-4" tradename, supplied by Showa Titanium K.K., average primary particle diameter: 0.03 $\mu$m), titanium dioxide fine powder having a porous alumina-supported layer was prepared and treated with silicone oligomer in the same manner as in Example 1 except that the calcium phosphate-supported layer was not formed. A coating was made and evaluated. The results obtained are shown in Table 1.

Comparative Example 7

Using ultrafine titanium dioxide powder ("F-4" tradename, supplied by Showa Titanium K.K., average primary particle diameter: 0.03 $\mu$m), titanium dioxide fine powder having a porous zirconia-supported layer was prepared in the same manner as in Example 4 except that the calcium phosphate-supported layer was not formed. A coating was made and evaluated. The results obtained are shown in Table 1.

TABLE 1

| | Calcium compound-supported layer (first supported layer) | Porous water-insoluble substance-supported layer (second supported layer) | Residual % of acet-aldehyde (%) | Residual % of coating (%) |
| --- | --- | --- | --- | --- |
| Example 1 | Calcium phosphate | Silica | 5 | 93 |
| Example 2 | Calcium oxide | Silica | 3 | 92 |
| Example 3 | Calcium phosphate | Alumina | 20 | 95 |
| Example 4 | Calcium phosphate | Zirconia | 15 | |

TABLE 1-continued

| | Calcium compound-supported layer (first supported layer) | Porous water-insoluble substance-supported layer (second supported layer) | Residual % of acetaldehyde (%) | Residual % of coating (%) |
|---|---|---|---|---|
| Example 5 | Calcium polycarboxylate | Zirconia | 13 | 90 |
| Com. Ex. 1 | — | — | 0.5 | 35 |
| Com. Ex. 2 | Calcium phosphate | — | 2 | 55 |
| Com. Ex. 3 | Calcium polycarboxylate | — | 1 | 53 |
| Com. Ex. 4 | Calcium oxide | — | 1 | 52 |
| Com. Ex. 5 | — | Alumina | 70 | 85 |
| Com. Ex. 6 | — | Silica | 10 | 60 |
| Com. Ex. 7 | — | Zirconia | 50 | 68 |

As seen from Table 1, the photocatalytic powder having a calcium compound-supported layer and a porous substantially water-insoluble substance-supported layer according to the present invention (Examples 1 to 5) has high photocatalytic function (namely, the residual percentage of acetaldehyde is small) and even after the long-term use, it exhibits small degradation effect on a plastic coating medium (namely, the residual percentage of coating is large). In contrast, the photocatalytic powder having only a calcium compound-supported layer (Comparative Examples 2 to 4) causes great degradation of a plastic coating medium after the long-term use, although the photocatalytic activity is high. Furthermore, the photocatalytic powder having only a substantially water-insoluble substance-supported porous layer (Comparative Examples 5 to 7) has low photocatalytic activity (except for the powder having a porous silica layer [Comparative Example 6]) and causes relatively large degradation of a plastic coating medium after the long-term use.

The photocatalytic titanium dioxide powder of the present invention exhibits photocatalytic activity upon irradiation of light and is widely used for the purpose of environmental clarification, for example, for removing malodor, decomposition-removing harmful substances or pollutants in air, treating drainage, purifying waste water, or imparting bactericidal or antifungal property. This environmental clarification can be performed effectively, safely and at a reduced cost. The photocatalytic titanium dioxide powder can be used by coating it on textile fiber, paper or plastic article, or incorporating it into fiber or plastic article at the step of making the fiber or plastic article, or in the form of a coating material to be coated on various structures. The photocatalytic activity of the photocatalytic powder can be kept over a long term without causing degradation of the medium.

The photocatalytic titanium dioxide powder of the present invention has a calcium compound-supported layer and further thereon a porous supported layer comprising a photocatalytically inactive and substantially water-insoluble s substance, therefore, when it is used in combination with an organic polymer medium, the medium does not degrade and high photocatalytic activity of the finely divided titanium dioxide particles continues for a long period of time. In particular, the superior durability of photocatalytic activity is manifested in the environment irradiated with strong light such as sunlight.

What is claimed is:

1. A photocatalytic titanium dioxide powder comprising finely divided titanium dioxide particles each having supported on the surface thereof a first supported layer comprising a calcium compound, and further having supported on the surface of said first supported layer-formed titanium dioxide particle a porous second supported layer comprising a photocatalytically inactive and substantially water-insoluble substance.

2. The photocatalytic titanium dioxide powder as claimed in claim 1, wherein said calcium compound is at least one compound selected from the group consisting of calcium phosphate, calcium oxide and a calcium salt of an organic carboxylic acid.

3. The photocatalytic titanium dioxide powder as claimed in claim 1, wherein said photocatalytically inactive and substantially water-insoluble substance is at least one substance selected from the group consisting of silica, alumina and zirconia.

4. The photocatalytic titanium dioxide powder as claimed in claim 1, wherein said finely divided titanium dioxide particles have a primary particle diameter of from about 0.001 $\mu$m to about 0.2 $\mu$m.

5. The photocatalytic titanium dioxide powder as claimed in claim 1, wherein at least one metal selected from the group consisting of platinum, rhodium, ruthenium palladium, silver, copper and zinc is further supported at least one of on the surface of the finely divided titanium dioxide particles, in or on the first supported layer and in or on the second supported layer.

6. A process for producing a photocatalytic titanium dioxide powder, comprising the steps of:
   providing a calcium compound on the surface of finely divided titanium dioxide particles to form a first supported layer; and then,
   providing a material capable of forming a photocatalytically inactive and substantially water-insoluble substance on the surface of said first supported layer-formed titanium dioxide particles, followed by drying or burning said material-supported titanium dioxide particles to form a porous second supported layer comprising the photocatalytically inactive and substantially water-insoluble substance.

7. The process for producing a photocatalytic titanium dioxide powder as claimed in claim 6, wherein the material capable of forming a photocatalytically inactive and substantially water-insoluble substance is a silicone oligomer or a silane coupling material.

8. The process for producing a photocatalytic titanium dioxide powder as claimed in claim 6, wherein said calcium compound is at least one compound selected from the group consisting of calcium phosphate, calcium oxide and a calcium salt of an organic carboxylic acid.

9. The process for producing a photocatalytic titanium dioxide powder as claimed in claim 6, wherein said finely divided titanium dioxide particles have a primary particle diameter of from about 0.001 $\mu$m to about 0.2 $\mu$m.

10. A process for producing a photocatalytic titanium dioxide powder, comprising the steps of:
    providing a calcium compound on the surface of finely divided titanium dioxide particles to form a first supported layer; and then,
    contacting the surface of said first supported layer-formed titanium dioxide particles with an aqueous alkali solution containing a metal ion, followed by neutralizing the metal ion-containing alkali solution to form a porous second supported layer comprising a photocatalytically inactive and substantially water-insoluble substance on the surface of said first supported layer-formed titanium dioxide particles.

11. The process for producing a photocatalytic titanium dioxide powder as claimed in claim 10, wherein said aqueous alkali solution containing a metal ion is an aqueous solution of alkali aluminate, alkali silicate or alkali zirconate.

12. The process for producing a photocatalytic titanium dioxide powder as claimed in claim 10, wherein said calcium compound is at least one compound selected from the group consisting of calcium phosphate, calcium oxide and a calcium salt of an organic carboxylic acid.

13. The process for producing a photocatalytic titanium dioxide powder as claimed in claim 10, wherein said finely divided titanium dioxide particles have a primary particle diameter of from about 0.001 $\mu$m to about 0.2 $\mu$m.

14. A process for producing a photocatalytic titanium dioxide powder, comprising the steps of:
   providing a calcium compound on the surface of finely divided titanium dioxide particles to form a first supported layer, and then
   hydrolyzing a metal alkoxide on the surface of said first supported layer-formed titanium dioxide particles to form a porous second supported layer comprising a photocatalytically inactive and substantially water-insoluble substance on the surface of said first supported layer-formed titanium dioxide particles.

15. The process for producing a photocatalytic titanium dioxide powder as claimed in claim 14, wherein the metal alkoxide is an alkoxide of aluminum, silicon or zirconium.

16. The process for producing a photocatalytic titanium dioxide powder as claimed in claim 14, wherein said calcium compound is at least one compound selected from the group consisting of calcium phosphate, calcium oxide and a calcium salt of an organic carboxylic acid.

17. The process for producing a photocatalytic titanium dioxide powder as claimed in claim 14, wherein said finely divided titanium dioxide particles have a primary particle diameter of from about 0.001 $\mu$m to about 0.2 $\mu$m.

18. A polymer composition comprising an organic polymer as a medium, and a photocatalytic titanium dioxide powder; said titanium dioxide powder comprising finely divided titanium dioxide particles each having supported on the surface thereof a first supported layer comprising a calcium compound, and further having on the surface of said first supported layer-formed titanium dioxide particles a porous second supported layer comprising a photocatalytically inactive and substantially water-insoluble substance.

19. A shaped article made of the polymer composition as claimed in claim 18.

20. A structure having a coating comprising the polymer composition as claimed in claim 18.

* * * * *